Aug. 22, 1967         W. T. RUSCH ET AL         3,337,748
              LOW DISSIPATION INDUCTANCE DRIVERS
Filed Dec. 23, 1963                          3 Sheets-Sheet 2
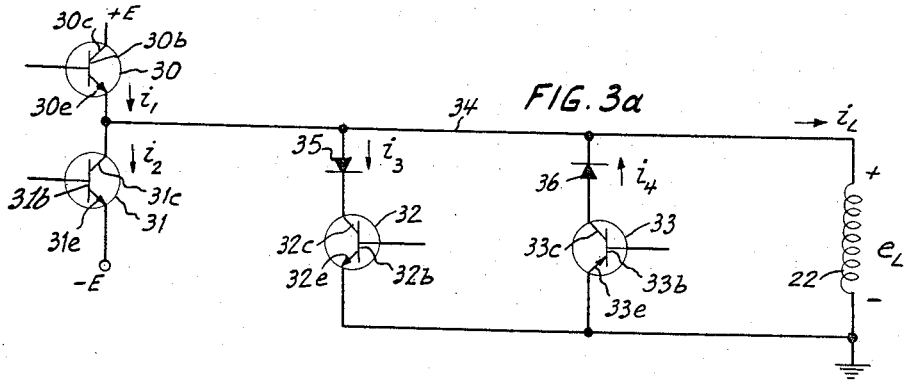
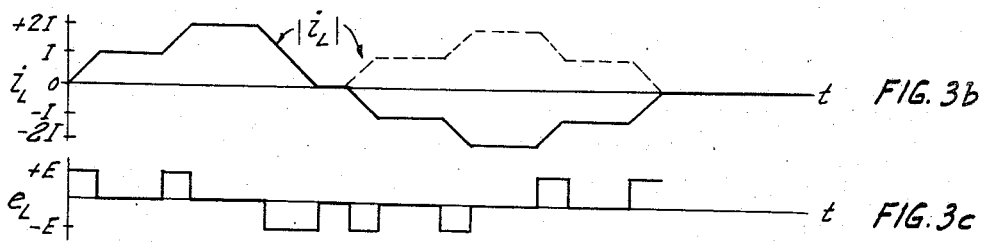
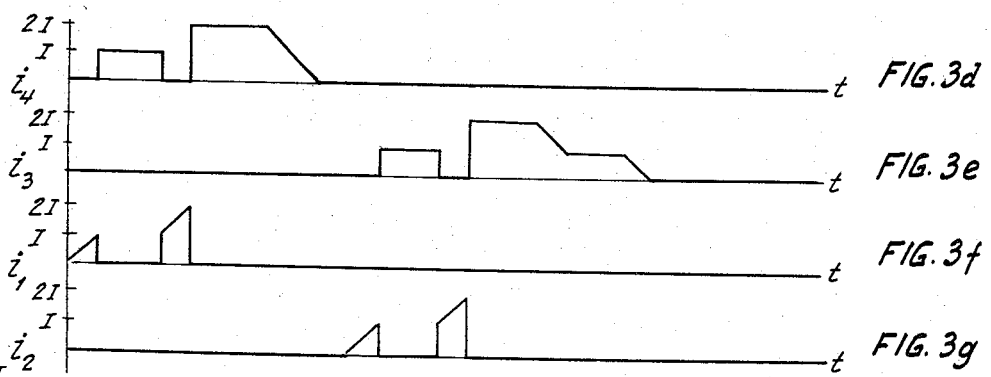
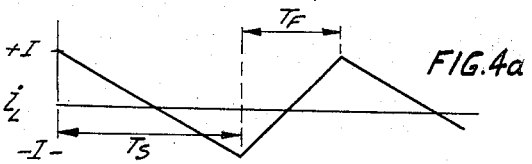
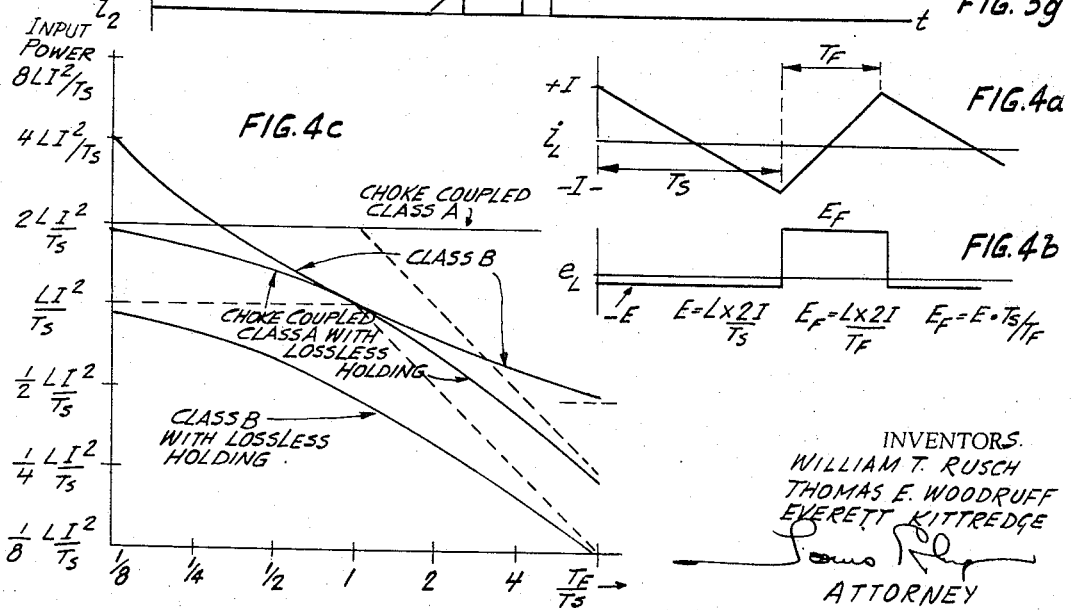
INVENTORS.
WILLIAM T. RUSCH
THOMAS E. WOODRUFF
EVERETT KITTREDGE
ATTORNEY Aug. 22, 1967 W. T. RUSCH ET AL 3,337,748
LOW DISSIPATION INDUCTANCE DRIVERS
Filed Dec. 23, 1963 3 Sheets-Sheet 3

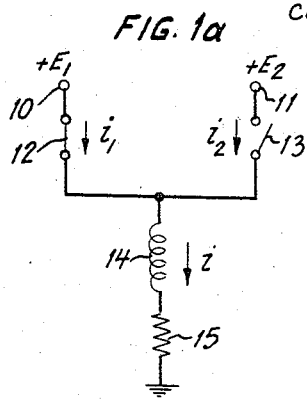
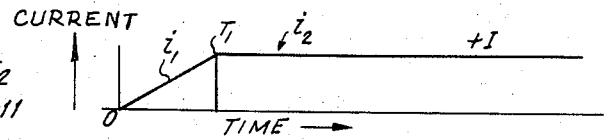
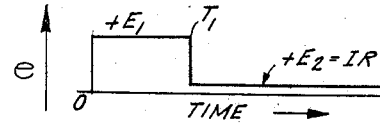
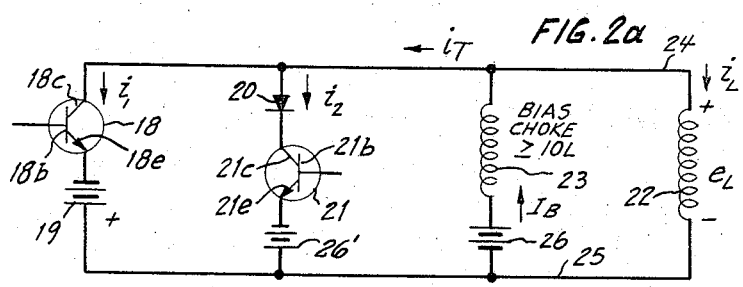
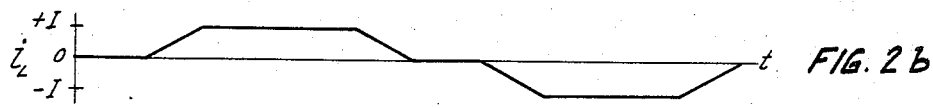
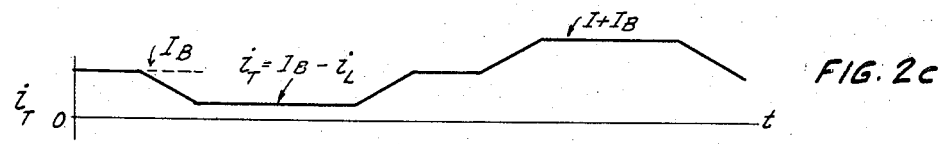
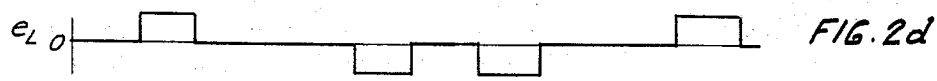
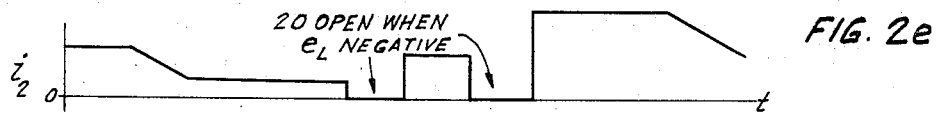
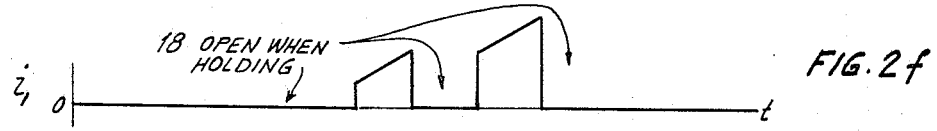

INVENTORS
WILLIAM T. RUSCH
THOMAS E. WOODRUFF
EVERETT KITTREDGE
BY
ATTORNEY

United States Patent Office 3,337,748
Patented Aug. 22, 1967

3,337,748
LOW DISSIPATION INDUCTANCE DRIVERS
William T. Rusch, Hollis, and Thomas E. Woodruff and Everett Kittredge, Nashua, N.H., assignors to Sanders Associates, Inc., Nashua, N.H., a corporation of Delaware
Filed Dec. 23, 1963, Ser. No. 332,613
21 Claims. (Cl. 307—88.5)

This invention relates to a low dissipation or "lossless" inductance driver. The circuit according to our invention is of general application to any system wherein a current is supplied to an inductive load, which current may be required to increase or decrease in accordance with time and/or load requirements, and to remain at a certain level, which may increase or decrease with time and/or load conditions, for a required period.

As an example, but not in limitation, we may mention its use in a magnetic deflection system for cathode ray tubes, wherein it is desired to deflect the beam on either or both axes in a one or a series of steps, and to hold the beam in deflected position or positions for predetermined time intervals. It may also be used to supply power for sawtooth deflection.

Again, in example but not in limitation, it may be used in the supply circuit for "Controlled Force" solenoids, and in general type solenoid applications, including tape recorder start-stop application, stepped film drive, D.C. motor applications, etc.

The general idea of our invention includes the use of several (two or more) voltage supplies and appropriate circuitry to drive an inductive load, and to radically decrease drive power requirements by drawing from the lowest voltage supply which is instantaneously required to provide the necessary load current.

Most power supplies, especially those having regulators, operate efficiently only when energy is being supplied by them, and are not readily adaptable to the charging process necessary for the recovery of energy stored in an inductive load. Additionally, energy will be distributed unevenly among the energy storage sources if the coil current waveform is not symmetrical about zero. For example, if the coil current is repeatedly raised from zero to a positive value and then reduced to a zero, energy will be drawn from the positive supply source or sources during the buildup of coil current in a positive direction (charging), and fed into the negative source or sources during each discharge (return of current to zero). This energy is not lost, but the nonsymmetrical process can lead to varying supply voltages.

The first of the above difficulties may be overcome by the use of capacitors as storage elements which may deliver energy efficiently to the coil or receive energy from it. The second difficulty is overcome by employing a bilateral energy transfer circuit which keeps the average energy and voltage of each capacitor at the desired equilibrium value. This will be more particularly explained with reference to FIGS. 5, 6, and 7.

The features of novelty which we believe to be characteristic of our invention are set forth with particularity in the appended claims. Our invention itself, however, both as to its fundamental principles and as to its particular embodiments, will best be understood by reference to the specification and accompanying drawing, in which FIG. 1a is a circuit diagram of a simple form of circuit illustrating the principles of our invention, FIG. 1b is a curve of currents, $i_1$ and $i_2$ as ordinates plotted against time as abscissa, FIG. 1c is a similar curve of voltage $e$ as ordinate plotted against time as abscissa, FIG. 2a is a circuit diagram of our invention as applied in a cathode ray tube deflection circuit embodying a bias choke and a class A amplifier, FIG. 2b is a plot of current $i_L$ as ordinate against time $t$ as abscissa, FIG. 2c is a similar plot of $i_T$ against time, wherein $i_T = I_B - i_L$, FIG. 2d is a similar plot of $e_L$ against time, FIG. 2e is a similar plot of $i_2$ against time, FIG. 2f is a similar plot of $i_1$ against time, FIG. 3a is a similar diagram of our invention as employed with a class B amplifier in one of several possible realizations, FIG. 3b is a plot of current $i_L$ as ordinate vs. time as abscissa, FIG. 3c is a similar plot of $e_L$ vs. time, FIG. 3d is a similar plot of $i_4$ vs. time, FIG. 3e is a similar plot of $i_3$ vs. time.

FIG. 3f is a similar plot of $i_1$ vs. time,

FIG. 3g is a similar plot of $i_2$ vs time,

Figure 5:
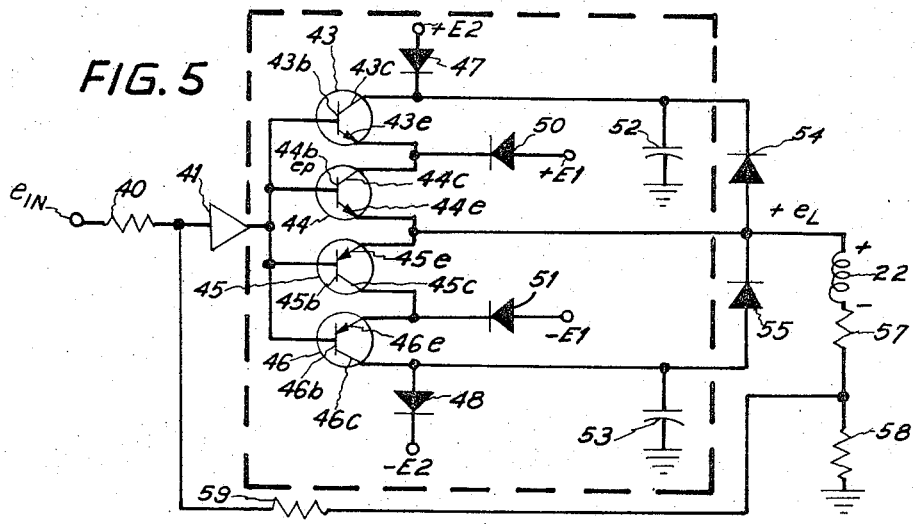
Figure 6:
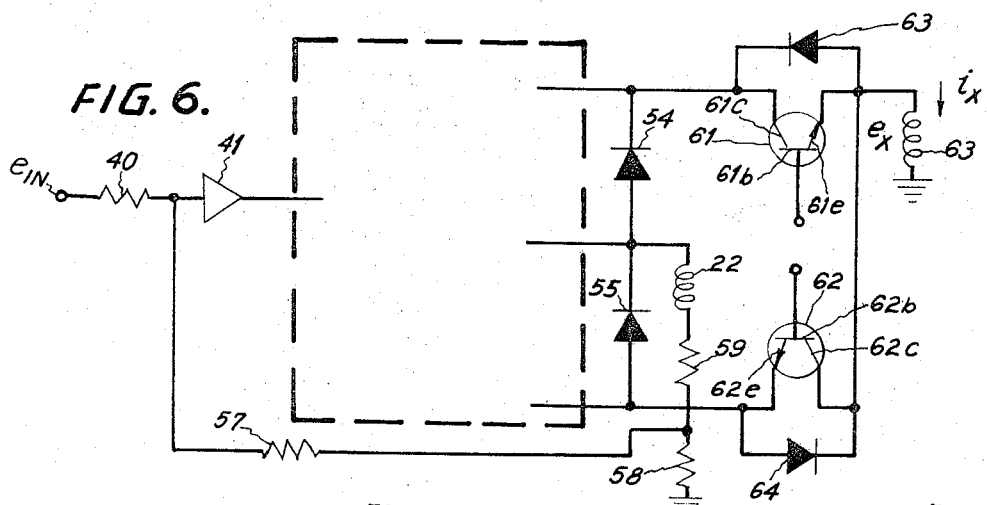
Figure 7:
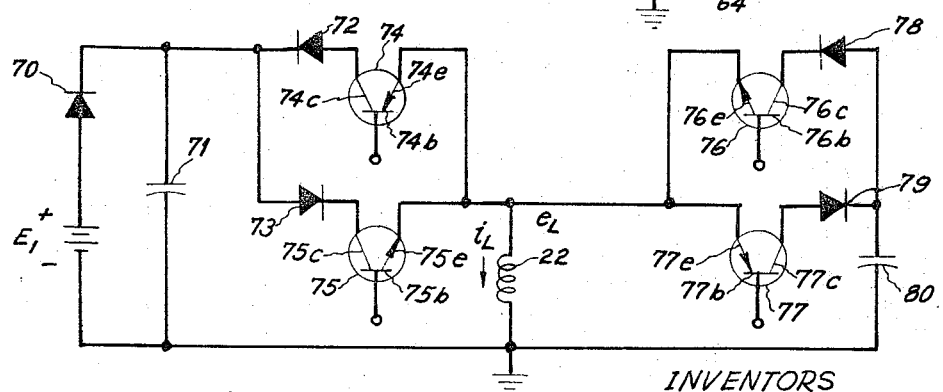

FIG. 4a is a plot of $i_L$ vs. time without circuit operating as a saw-tooth generator, FIG. 4b is a similar curve of $e_L$ vs. time, FIG. 4c is a series of curves showing the power required by our invention as compared with conventional circuits, FIG. 5 is a circuit diagram of another circuit embodying our invention, and FIGS. 6 and 7 are circuit diagrams of still other embodiments of our invention.

Referring now more particularly to FIGS. 1a, 1b, and 1c, $E_1$ and $E_2$ represent a pair of direct current voltage sources having their positive sides connected to terminals 10 and 11 respectively, and their negative sides grounded.

Switches 12 and 13, here shown for explanatory purposes as manual switches, are actually controlled resistance electronic devices, for example, transistors, tubes or any other controlled resistance element. The lower sides of switches 12 and 13 are connected to the upper terminal of inductance 14, the lower end of which is grounded. The resistance shown at 15 may be the resistance of inductance 14, and is not necessarily a physically separate resistance. The current through switch 12 is $i_1$; that through switch 13 is $i_2$.

The D.C. voltage $e$ from the upper terminal of inductance 14 to ground, as will be understood, is $$e = L\frac{di}{dt} + Ri$$

wherein $i$ is the current through inductance 14 and resistance 15, L the inductance of inductance 14, and R the value of resistance 15.

When the circuit is put into operation, switch 12 is closed and switch 13 is open. Under these conditions, current $i_1$ supplied by source $E_1$ builds up from zero, and reaches a predetermined level, I, at time $T_1$ at which time switch 12 opens, switch 13 closes, and current $i_2$ flows at the predetermined value, I, drawn from source $E_2$. As shown in FIG. 1c, source $E_1$ supplies voltage from time zero to time $T_1$, at which time $E_2$ supplies a much lower voltage, which need only equal IR. It can be demonstrated mathematically that for any time after $T_1$, when holding current is drawn from source $E_2$, the portion of input power due to holding current drawn by the circuit is reduced in the ratio of $E_1/E_2$, without impairing holding.

Referring now to FIG. 2a, and enlarging upon the principles of FIG. 1a, 18 represents a transistor having base 18b, collector 18c, and emitter 18e. The emitter is connected to the negative terminal of voltage source 19, the positive terminal of which is connected to the lower terminal of inductance 22, which, for example but not in limitation, may be the horizontal deflection coil of a cathode ray tube.

Diode 20 has one terminal connected to collector 18c of transistor 18, and the other to collector 21c of transistor 21. The emitter 21e of transistor 21 is connected to the lower terminal of inductance 22. For simplicity, the connections to the base 18b of transistor 18 and base 21b of transistor 21 are omitted. Bias choke 23 has its upper terminal connected to line 24, to which the upper terminal of inductance 22, diode 20, and collector 18c of transistor 18 are connected. The lower end of bias choke 23 is connected through voltage source 26 to line 25, to which the lower end of inductance 22, emitter 21e, and the positive terminal of source 19 are also connected.

The inductance of bias choke 23 is equal to or greater than ten times that of inductance 22. The current through inductance 22 is indicated by $i_L$, that flowing from the top terminal of bias choke to the left is $i_T$, the current through bias choke 23 is $I_B$, and that flowing down through diode 20 is $i_2$.

Turning now to FIGS. 2b, 2c, 2d, 2e, and 2f, the operation of the circuit is as follows:

Bias current $I_B$ comes from a low voltage, low power supply 26. Because the D.C. resistive losses in inductance 22 and bias choke 23 are small, the bias supply 26 is usually of the order of one or two volts. Considering the waveforms in FIGS. 2b-2f, initially (when the circuit is turned on), transistor 18 is biased off by proper control of its base potential. The emitter 21e of transistor 21 is connected to another low voltage, low power negative supply such as 26', which balances the voltage drops through diode 20 and transistor 21 so as to keep $e_L$ (the voltage across inductance 22)=0 and thus to insure that $i_L=0$. In practice, the small voltage source 26' connected between emitter 21e and line 25 is desirable to overcome holding losses.

When it is desired to increase $i_L$, transistor 21 is controlled in the proper manner to increase its resistance and thereby lower $i_2$ (and $i_T$). Thus, more of the "constant" bias current $I_B$ flows through coil 22, increasing $i_L$. The required positive coil voltage, $e_L$, is supplied by the inductive reaction from bias choke 23; with a high inductance bias choke, only a very small $dI_B/dT$ is required to generate the necessary voltage.

When $i_L$ has increased to the required value, transistor 21 is controlled so as to force $e_L$ back to zero (again, small resistive losses are neglected). Thus, $i_L$ remains constant ("holds") at its previous value with negligible power dissipation, since the holding current $i_L$ flows through transistor 21, and not through transistor 18 and source 19. When it is desired to reduce $i_L$ from its "hold" level, then, and only then, transistor 18 comes into action. Transistor 18 is made to conduct (by appropriate base control and without saturating; saturation would cause serious storage delay when the time comes to open transistor 18). As soon as transistor 18 conducts, $e_L$ is forced to be negative and $i_L$ reduces $i_2=0$ during this operation because diode 20 is reverse biased.

When $i_L$ has been reduced as far as required, transistor 18 is again commanded to open. At that time, current $i_T$ flows through diode 20 and transistor 21, and transistor 21 "losslessly" controls the holding of $i_L$ at the required value.

The power saving is apparent from the waveforms in FIGS. 2b–2f, inclusive. If diode 20 and transistor 21 were not used, the average value of input power would be $E \times \overline{i_T}$; when diode 20 and transistor 21 are added to the circuit, input power drops to $E \times \overline{i_1}$. E is the voltage of source 19.

Turning now to FIG. 3a, this figure shows some of the principles of our invention as applied in a Class B circuit. The particular form of the circuit is for example only. Other configurations are, of course, possible.

In this instance, as before, 22 represents the inductive load, current for which is supplied by transistors 30, 31, 32, or transisor 33 depending on load conditions, as will be explained. Collector 30c is connected to the plus side of the voltage supply, +E. Emitter 30e is connected to collector 31c, and emitter 31e is connected to −E, the negative side of the voltage supply. A connection is made from emitter 30e and collector 31c to the top terminal of coil 22. Oppositely poled diodes 35 and 36 have one terminal connected to line 34, the other to collectors 32c and 33c of transistors 32 and 33, respectively. Emitters 32e and 33e are connected to lower terminal of coil 22 and to ground. For simplicity, the connections of bases 30b, 31b, 32b and 33b have been omitted.

The operation of the circuit will be clear from reference to FIGS. 3b–3g inclusive; it is similar to that of FIG. 2a. Transistor 30 is allowed to become conductive only when $i_L$ (the load current) is greater than zero and increasing. At this time, $e_L$ (the voltage across load coil 22) is positive, so diode 36 keeps transistor 33 from being biased in the wrong direction. Transistors 31 and 32 are kept nonconducting, by appropriate base control, while transistor 30 is conducting. When $i_L$ reaches its prescribed positive level, transistor 30 is also made nonconductive while transistors 31 and 32 are still nonconducting, and the stored positive current in coil 22 flows through transistor 33. Current $i_L$ will theoretically remain at the prescribed positive value indefinitely; but in practice a low voltage, low power positive supply connected to emitter 33e would be adequate to supply the small D.C. losses in transistor 33, diode 36, and coil 22. Coil current $i_L$ may be held at this level or reduced to zero by controlling the resistance of transistor 33.

Operation is similar when load current is negative. Transistor 31 conducts only when $i_L$ is negative and going more negative. For all conditions where $i_L$ is negative and holding, or negative and decreasing in magnitude, 32 is the only conducting transistor. The considerable saving of power accomplished by the lossless holding technique is clear. Inspection of FIG. 3a and the waveforms of FIGS. 3b–3g show that without the use of transistors 32 and 33, input power would be $$E \times \overline{|i_L|}$$

With transistor 32 and 33, input power is $E \times (\overline{i_1} + \overline{i_2})$. Comparison of $$\overline{|i_L|}$$

with $\overline{i_1} + \overline{i_2}$ shows the saving and indicates the usefulness of the technique, especially when long hold times are required.

The waveforms indicate that "return to center" (i.e., to $i_L=0$) between positions of holding might not always be advantageous from a power standpoint. For example, if $i_L$ were at current 2I and required to change to I, this can be accomplished, without power supply drain, by control of transistor 33. But, if $i_L$ were reduced to zero, additional current through transistor 30 and from the +E supply would be required to raise $i_L$ back to +I.

The circuits of FIGS. 2a and 3a may be used to generate sawtooth deflection current, with substantial power savings over conventional circuits. Refer now to FIGS. 4a and 4b. FIG. 4a is a plot of $i_L$ vs. time, and FIG. 4b a plot of $e_L$ vs. time. Time $T_S$ is sweep time, and $T_F$ is flyback time. It can be shown that for the circuit of FIG. 2a (choke coupled Class A with lossless holding), the power required is $$\frac{2LI^2}{T_S+T_F}$$

Similarly, for the circuit of FIG. 3a, power required is $$\frac{LI^2}{T_S+T_F}$$

A comparison of power required for conventional choke coupled Class A circuits and that required for choke coupled Class A circuits with lossless holding, and of conventional Class B circuits and Class B with lossless holding is shown in FIG. 4c, from which it is clear that the power saving advantages of lossless holding according to our invention can be considerable.

Referring now to FIG. 5, in which we have shown still another embodiment of our invention, $e_{IN}$ represents the input terminal to which a control voltage is applied, which, through resistance 40 is applied to deflection amplifier 41, the output of which is connected to bases 43b, 44b, 45b and 46b of transistors 43, 44, 45 and 46.

A relatively high source of voltage $E_2$, which may be of the order of 40–50 volts, is provided having its + terminal connected through diode 47 to collector 43c of transistor 43, and its minus terminal connected through diode 48 to the collector 46c of transistor 46. Emitter 43e of transistor 43 is connected to collector 44c of transistor 44, and emitter 44e of transistor 44 is connected to the common connection of diodes 54 and 55 and to the upper (+) terminal of inductance 22, the deflection coil. Typical numerical values associated with deflection amplifier design are:

L (inductance of deflection coil 22)=50µh.
r (resistance of coil 22, shown as resistor 57)=0.2 ohm.
$\Delta i_L$=10 amps.

Resistance 57 is the resistance of inductance 22, which is connected through resistance 58 to ground. The common point of resistance 40 and amplifier 41 is connected through resistance 59 to the common point of inductance 22 and resistance 58. Emitter 45e of transistor 45 is connected to the common point of diodes 54 and 55, and to the + terminal of inductance 22. Collector 45c of transistor 45 is connected to emitter 46e of transistor 46 and through diode 51 to the minus terminal $E_1$ of a second and lower source of voltage (about 5 volts). Emitter 43e of transistor 43 and collector 44c of transistor 44 are connected through diode 50 to $+E_1$.

Condenser 52 is connected from the common point of diodes 47 and 54 to ground, and condenser 53 is connected from the common point of diodes 48 and 55 to ground.

The operation of the circuit is as follows:

When it is desired that $i_L$ increase to a positive value I, voltage $e_p$ increases to about $+E_2$, turning transistors 43 and 44 on, As already described, voltage $E_2$ is significantly greater than E. Under these conditions diode 50 is reverse biased and nonconducting because emitter 43e and collector 44c are approximately at $+E_2$. Thus, when coil current is positive and increasing, it flows from source $+E_2$ or capacitor 52 through transistors 43 and 44.

When $i_L$ reaches the desired value $+I$, voltage $e_p$ reduces to a level between zero and $+E_1$. Its value when holding $i_L$ at I is approximately $I(r_{57}+r_{58})$. The positive holding current of coil 22 is supplied from low voltage supply $+E_1$ through diode 50 and transistor 44 instead of from the high voltage source $+E_2$, thereby conserving power. Because the collector current of transistor 44 flowing through diode 50 clamps the emitter 43e of transistor 43 at the voltage of $E_1$, transistor 43 is cut off since its base voltage is more negative than its emitter voltage. When holding, transistor 44 adjusts to compensate for the small voltage difference between supply $+E_1$ and the required holding voltage at different values of positive holding current.

When it is desired to reduce $i_L$ from $+I$ to a lower positive level or to zero, voltage $e_p$ goes negative to about $-E_2$. The stored energy in coil 22 produces a negative inductive voltage reaction which increases in magnitude until diode 55 conducts. Transistors 44 and 45 are nonconducting, which leaves only one possible path for coil current, i.e., through capacitor 53 and diode 55. Thus, the stored energy transfers into capacitor 53, charging this capacitor slightly more negative than $-E_2$, which opens diode 48. If the above process occurred repeatedly, energy would be drained continually from the $+E_2$ supply and from capacitor 52 and deposited in capacitor 53, causing the voltage of capacitor 53 to go more negative than allowable for proper circuit operation. This may be prevented by the use of the circuit of FIG. 6.

Referring now to FIG. 6, this is the same as FIG. 5 as to the elements enclosed in the dotted line boxes, but, in addition, a path X circuit is provided, comprising transistors 61 and 62, and inductance 63. Transistor 61 has its collector 61c connected to the common point of diode 54 and capacitor 52, its emitter 61e to the top of inductance 63 (the bottom of which is grounded), its base 61b to a suitable terminal, and its collector 61c and emitter 61e connected through diode 63. Transistor 62 has its base 62b connected to a suitable terminal, its collector 62c to the top of coil 63, and its emitter 62e to the common point of diode 55 and capacitor 53. Emitter 62e and collector 62c are connected through diode 64.

The operation of this addition to the circuit of FIG. 5 is:

Whenever the voltage on capacitor 53 goes below a prescribed negative value, transistor 62 is turned on and left on until the voltage of capacitor 53 returns to its normal level. The excess energy is absorbed by inductance 63. During this operation, transistor 61 is biased off and diode 63 is reverse biased. When transistor 62 is turned off, the energy stored in inductance 63 is transferred back to capacitor 52 since $e_x$ goes positive and the stored negative $i_x$ flows through diode 63 into capacitor 52.

The process is similar for negative values of current. Sensing resistor 58 and inverse current feedback resistor 59 are used to make $$i_L \cong -\frac{r_{59}}{r_{40}r_{58}} \cdot e_{IN}$$

under conditions of large loop gain. Supplies $+E$ and $-E_2$ are necessary to provide for small, but real, transistor, diode and resistive losses.

When energy transfer is such that the voltage on capacitor 53 is more negative than $-E_2$, supply $-E_2$ is nonconducting due to the presence of diode 48, and operation of $+E_2$ is similar due to the presence of diode 47. Thus, the supplies conduct only as necessary to overcome the irreducible losses.

It will be noted that load current flows only through one supply at a time, but can flow through one or more transistors in series. An advantage of series connection of the transistors is that they may be driven from a single point drive, $e_p$, and correct operation occurs. While parallel operation of transistors is also possible, and may offer advantages in certain instances, it has the disadvantage that a single point drive common to all transistor bases does not appear feasible.

The instantaneous matching of required load voltage to the proper supply as shown and described herein may be used with other than inductive loads. The saving of power is due to the drawing of load current from the voltage supply of lowest voltage adequate to meet instantaneous load requirements.

In the circuit of FIG. 6, coil 63 is shown in the energy transfer circuit. This could perform the same function as coil 22 (deflection, solenoid force, etc.) in conjunction with coil 22 and still serve its original purpose of energy transfer. For example, if $i_x=-i_L$, whenever coil 22 took a certain amount of energy from capacitor 52, coil 63 would take the same amount from capacitor 53. When coil 22 feeds its energy into capacitor 53, coil 63 would feed an equal amount into capacitor 52, keeping both 52 and 53 charged to the desired values. Proper polarity connections of coil 22 and coil 63 would ensure that their joint operation performs the required electromagnetic function.

Our experience indicates that the emitter follower transistor connection as shown herein, using PNP and NPN transistors as required, is usually desirable for driving inductive loads in current feedback amplifiers, although composite connections are advantageous where output power transistors of the same type are desirable. Cascaded emitter followers may also be used.

With the capacitor storage and energy transfer circuits herein shown and described, some of the supplies required by conventional counterpart circuits may be eliminated. For example, in FIGS. 5 and 6, certain conditions might warrant removal of the $-E_2$ supply. In this case capacitor 53 would be charged by coil 22 through diode 55, and by coil 63 through diode 64. Elimination of the $-E_2$ supply would be possible if the average energy taken from capacitor 53 through transistors 46 and 62 equalled that injected through diodes 55 and 64.

Another embodiment of our invention is shown in FIG. 7, which is particularly adapted for use with symmetrical sawtooth waveforms. Assuming that a linear sweep is required when $i_L$ is increasing, a large capacitor 71 is provided whose voltage remains approximately at $+E_1$. Diode 70 is interposed between $+E_1$ and the top of capacitor 71, which is connected through diodes 72 and 73 respectively to the collectors 74c and 75c of transistors 74 and 75. The emitters 74e and 75e are connected to the top of inductance 22, the bottom of which is grounded.

The top of coil 22 is also connected to the emitters 76e and 77e of transistors 76 and 77 respectively. The collectors 76c and 77c are connected through diodes 78 and 79 respectively to the top of capacitor 80, the lower side of which is grounded. The transistor bases 74b, 75b, and 77b are connected to a suitable point or points.

The operation of the circuit is:

Transistor 75 conducts when $i_L$ is positive and increasing; transistor 76 conducts when $i_L$ is positive and decreasing. Transistor 77 conducts when $i_L$ is negative and going more negative, and transistor 74 conducts when $i_L$ is negative and going less negative (toward zero).

Energy is transferred with minimum losses between capacitor 71 and coil 22, and between capacitor 80 and coil 22. "Flyback," when $i_L$ goes from its maximum positive value to an equal negative value, can be made to occur as a half-cycle resonant sinusoid if the value of capacitor 80 is chosen for this result. Linear flyback is attained by making capacitor 80 relatively large so that its voltage remains relatively constant and negative. The diodes in series with the transistors serve to maintain a high impedance path when wrong polarity voltage would otherwise be impressed across the collector-emitter junction of the transistors.

The circuit of this figure provides for transistor control $i_L$ at all times, as required for many applications requiring high precision. For example, if $i_L$ is negative and the coil is discharging toward zero current, the normal path is through transistor 74. Thus, the discharge rate may be reduced by increasing the impedance of transistor 74 appropriately. If the discharge rate is too high, transistor 77 can be turned on to draw additional current from the coil, because $e_L$ is positive at that time.

In certain instances requiring less precision, the circuit of FIG. 7 may be simplified, by omitting transistors 75 and 77 and their associated diodes 73 and 79, and by connecting diodes 72 and 78 between the collector and emitter of transistors 74 and 76, respectively. With this simplified circuit, transistor 74 conducts positive and increasing coil current; when 74 opens, the stored energy of the coil flows through capacitor 80 and diode 78. Transistor 76 conducts negative coil current which is going more negative, either resonantly or linearly as already discussed. When $i_L$ is negative and transistor 76 is opened, the stored coil current flows through diode 72 into capacitor 71 approximately linearly if capacitor 71 is large. Control is more limited than with the circuit of FIG. 7, but could be increased by permitting a bias current to flow through transistor 76 when diode 72 is conducting. Control of transistor 76 current above and below this bias level could permit control of $i_L$ when the coil is discharging through diode 72. Bias current through transistor 74 would permit similar control when the coil is discharging through diode 78.

While we have shown and described certain preferred embodiments of our invention and the best mode presently known to us for practicing the same, it will be understood that modifications and changes may be made without departing from the spirit and scope of our invention.

What is claimed is:

1. A low loss power supply system comprising, in combination, a source of substantially constant current connected to one terminal of a load, a diode connected in series with a first transistor, the series combination of said diode and said transistor being connected across said load, a second transistor connected in series with a voltage supply, and said last-named series combination being connected in parallel with the series combination of said diode and said first transistor.

2. The combination claimed in claim 21 with means for increasing the resistance of said first transistor to increase the part of said constant current flowing through the load.

3. The combination claimed in claim 21 with means for rendering said second transistor conductive to reduce the load current.

4. The combination claim in claim 21 with means for rendering said second transistor conductive when, and only when, the load current is to be reduced.

5. The combination claimed in claim 21 with means for increasing the resistance of said first transistor when load current is to be increased, and for rendering said second transistor conductive when said load current is to be reduced.

6. The combination claimed in claim 21 with means for causing said first transistor to control the voltage developed across an inductive load in a manner to reduce said load voltage to substantially zero when said load current reaches a predetermined value.

7. A low loss power supply system comprising, in combination, a pair of diodes, a first pair of transistors, one of said diodes being serially connected with one of said transistors and the other of said diodes being serially connected with the other of said transistors, said diodes being oppositely poled and connected together at a common point, the combinations of said series-connected diodes and transistors being connected in parallel across a load, a second pair of transistors connected in series across a source of voltage, and means connecting the common point of said diodes to the connection between said second pair of transistors.

8. The combination claimed in claim 7 with means for preventing the transistor connected to the positive side of said voltage source from becoming conductive except when load current is positive and increasing.

9. The combination claimed in claim 7 with means for permitting conduction of one of said transistors and for preventing conduction by all other of said transistors during the time said one transistor is conducting.

10. The combination claimed in claim 7 with means for preventing the transistor connected to the negative side of said voltage source from becoming conductive except when load current is negative and decreasing.

11. The combination claimed in claim 7 with means for causing conduction in only one of said transistors while preventing conduction in all others only when load current is negative and decreasing in magnitude.

12. The combination claimed in claim 7 with means for preventing conduction in all said transistors except the one having its emitter connected to the negative source of voltage, when the load current is negative and going more negative.

13. The combination claimed in claim 7, with means for causing one of said transistors to become conductive only when the load current is positive and increasing, for causing another of said transistors to become conductive only when the load current is negative and going more negative, for causing still another of said transistors to become conductive only when the load current is negative and holding, or is negative and decreasing in magnitude, and for causing another of said transistors to become conductive only when the load current has a desired value.

14. A low loss rechargeable power supply system comprising, in combination, a load, a pair of storage elements, and a bilateral energy transfer circuit connected between said storage elements and said load for delivering energy from said storage elements to said load and for absorbing energy from said load for delivery to said storage elements, said bilateral energy transfer circuit including means for maintaining the average energy and voltage of each of said storage elements at a desired equilibrium value.

15. The combination claimed in claim 14 having a pair of rectifiers, each of said rectifiers being connected in series between one of said storage elements respectively, and said load.

16. The combination claimed in claim 14, wherein said bilateral energy transfer circuit includes a pair of selectable sources of potential of different magnitude, and means for selecting the source most nearly providing a voltage match with said load.

17. The combination claimed in claim 14 in which one of said storage elements has a large capacity to simulate a battery, and the other has a smaller value chosen to provide desired half-cycle resonance.

18. The combination claimed in claim 14, wherein said bilateral energy transfer circuit includes two pairs of transistors, each pair having the emitter of one transistor connected to the collector of the other, respectively, and a common connection between one emitter of each pair of transistors and one end of said load.

19. A low loss rechargeable power supply for use with a load comprising, in combination, a source of voltage, a first rechargeable storage element, a load, at least one transistor and one diode connected between said first storage element and said load, a second rechargeable storage element, and at least one transistor and one diode connected between said second storage element and said load, and means for operatively connecting said source of voltage to said transistors.

20. A low loss rechargeable power supply system for use with a load, comprising, in combination, a plurality of storage elements for delivering energy to said load, means for selectively connecting any one of said storage elements to said load, and energy transfer circuits connected between said storage elements and said load for maintaining the average energy and voltage of each of said storage elements at a desired equilibrium value.

21. A low loss power supply system in accordance with claim 1, wherein said constant current source comprises a voltage source in series with an inductance, said constant current source being connected across said load.

References Cited
UNITED STATES PATENTS

| | | | |
|---|---|---|---|
| 3,021,454 | 2/1962 | Pickens | 317—148.5 |
| 3,143,668 | 8/1964 | Bloodworth et al. | 307—88.5 |
| 3,158,791 | 11/1964 | Deneen et al. | 317—148.5 |
| 3,183,412 | 5/1965 | Arends | 317—123 |

ARTHUR GAUSS, *Primary Examiner.*

S. D. MILLER, *Assistant Examiner.*